United States Patent [19]

Enomoto et al.

[11] Patent Number: 5,219,811

[45] Date of Patent: Jun. 15, 1993

[54] POWDER COMPOSITION FOR SINTERING INTO MODIFIED BARIUM TITANATE SEMICONDUCTIVE CERAMIC

[75] Inventors: Takamitsu Enomoto; Midori Kawahara; Noboru Murata; Hiroshi Ueda; Naoki Okada, all of Ube, Japan

[73] Assignee: Central Glass Company, Limited, Ube, Japan

[21] Appl. No.: 841,210

[22] Filed: Feb. 27, 1992

Related U.S. Application Data

[63] Continuation of Ser. No. 568,100, Aug. 16, 1990, abandoned.

[30] Foreign Application Priority Data

| Aug. 31, 1989 | [JP] | Japan | 1-225061 |
| Aug. 31, 1989 | [JP] | Japan | 1-225062 |
| May 28, 1990 | [JP] | Japan | 2-137667 |
| Jul. 2, 1990 | [JP] | Japan | 2-172654 |

[51] Int. Cl.$^5$ .......................................... C04B 35/46
[52] U.S. Cl. .................................... 501/138; 501/139
[58] Field of Search ................ 501/134, 139, 138; 252/520, 521

[56] References Cited

U.S. PATENT DOCUMENTS

| 2,758,911 | 8/1956 | Lyod et al. | 423/598 |
| 3,441,517 | 4/1969 | Brauer et al. | 252/520 |
| 3,975,307 | 8/1976 | Matsuo et al. | 501/139 X |
| 4,101,454 | 7/1978 | Kulwicki et al. | 252/514 |
| 4,483,933 | 11/1984 | Kobayashi et al. | 501/138 |
| 4,764,494 | 8/1988 | Sakabe et al. | 501/136 X |
| 4,820,670 | 4/1989 | Sano et al. | 501/136 |
| 4,987,107 | 1/1991 | Narumi et al. | 501/139 X |

FOREIGN PATENT DOCUMENTS

| 0294991 | 12/1988 | European Pat. Off. |
| 53-29386 | 8/1978 | Japan . |
| 54-10110 | 5/1979 | Japan . |
| 63-28324 | 6/1988 | Japan . |

OTHER PUBLICATIONS

"Ceramics", vol. 5, No. 11 (1970), pp. 68-76 H. Sasaki partial translation.
Japanese Abstract JP 61-146710 A (Jul. 4, 1986).

Primary Examiner—Mark L. Bell
Assistant Examiner—Deborah Jones
Attorney, Agent, or Firm—Keck, Mahin & Cate

[57] ABSTRACT

To produce a modified barium titanate ceramic which is semiconductive and sufficiently high in breakdown voltage and has a low specific resistance at room temperature and a high positive temperature coefficient (PTC) of resistance, the invention provides a powder composition comprising (A) a basic mixture consisting of 45-85 mol % of $BaTiO_3$ powder, 1-20 mol % of $SrTiO_3$ powder, 5-20 mol % of $CaTiO_3$ powder and 1-20 mol % of $PbTiO_3$ powder, (B) a source of a dopant element such as Nb, Sb, Y, La or Ce to render the ceramic semiconductive, (C) a source of Mn such as $MnC_2O_4$ and/or a source of Cu such as CuO added such that the total amount of Mn and Cu is not more than 0.06 mol % on the basis of the quantity of the mixture (A) with proviso that the amount of Mn is not more than 0.025 mol % and (D) $SiO_2$ amounting to 0.1-2.0 mol % on the basis of the quantity of the mixture (A). The $BaTiO_3$ powder and the $SrTiO_3$ powder are produced by calcining $BaTiO(C_2O_4)_2$ and $SrTiO(C_2O_4)_2$, respectively, and in each of these powders very fine primary particles agglomerate to constitute porous and coarse secondary particles (about 100-200 μm). The $PbTiO_3$ powder may be produced by calcining $PbTiO(C_2O_4)_2$ so as to have nearly the same structure as the $BaTiO_3$ and $SrTiO_3$ powders. The aimed ceramic is produced by compacting the powder composition into a green body and sintering it at 1300°-1400° C.

7 Claims, 5 Drawing Sheets

100μm 0.1μm

POWDER COMPOSITION FOR SINTERING INTO MODIFIED BARIUM TITANATE SEMICONDUCTIVE CERAMIC

This application is a continuation of application Ser. No. 07/568,100, filed Aug. 16, 1990, now abandoned.

BACKGROUND OF THE INVENTION

This invention relates to a powder composition which serves as a sintering material for a modified barium titanate semiconductive ceramic having a positive temperature coefficient of resistance and a method of producing the ceramic by using the powder composition.

It is well known that barium titanate ceramics can be rendered semiconductive by using a suitable dopant element such as Nb, Sb or a rare earth element such as Y, La or Ce. Barium titanate semiconductive ceramics are relatively low in specific resistance at normal temperature and, above the Curie temperature, have a high positive temperature coefficient (PTC) of resistance.

Usually the Curie temperature of a barium titanate semiconductive ceramic lies at about 120° C., and it is known that the Curie temperature can be shifted to higher temperatures by partial substitution of Ba by Pb and to lower temperatures by partial substitution of Ba by Sr and/or Ca or by partial substitution of Ti by Zr and/or Sn. Sometimes the substitutions of Sr, Ca, Zr and/or Sn are made for the purpose of improving the electrical characteristics of the semiconductive ceramic.

Furthermore, there are proposals of additives to barium titanate base semiconductive ceramics for the purpose of stabilizing the important characteristics or desirably varying the temperature-resistance characteristics above the Curie temperature. For example, U.S. Pat. No. 3,441,517 shows the addition of Cu or Fe, and U.S. Pat. No. 4,101,454, JP 53-29386, JP 54-10110 and JP 63-28324 show the addition of Mn and Si or $SiO_2$.

Barium titanate base semiconductive ceramics or PTC thermistors are used as self-regulating constant temperature heater elements, current limiting elements, temperature controlling elements, etc. For these uses the semiconductive ceramics are often required to be very low in specific resistance at normal temperature. However, from a practical point of view, barium titanate base semiconductive ceramics desirably low in specific resistance have not yet been developed because lowering of the specific resistance by known measures is accompanied by great degradation of the temperature-resistance characteristics and/or great lowering of the breakdown voltage. For example, when the specific resistance of conventional barium titanate base PTC ceramics is lowered to about 5Ω.cm the temperature coefficient of resistance lowers to about 7 (%/°C.), and the breakdown voltage lowers to the extent of about 30 V/mm (M. Nishii, Electronic Ceramics (a Japanese Journal), May, 1988, pp. 22-27).

SUMMARY OF THE INVENTION

It is an object of the present invention to provide a powder composition which contains $BaTiO_3$, $SrTiO_3$, $CaTiO_3$ and $PbTiO_3$ as basic materials and provides, by sintering, a modified barium titanate base semiconductive ceramic which is sufficiently low in specific resistance at normal temperature and sufficiently high in breakdown voltage and exhibits a high positive temperature coefficient of resistance above the Curie temperature.

It is another object of the invention to provide a method of producing a modified barium titanate semiconductive ceramic having the above features by using a powder composition according to the invention.

The present invention provides a powder composition for producing a modified barium titanate ceramic, the powder composition comprising (A) a basic mixture consisting of 45-85 mol % of a $BaTiO_3$ powder, 1-20 mol % of a $SrTiO_3$ powder, 5-20 mol % of a $CaTiO_3$ powder and 1-20 mol % of a $PbTiO_3$ powder, (B) at least one dopant element to render the ceramic semiconductive, which is selected from Nb, Sb and the rare earth elements (inclusive of Y and La) and in the form of an oxide or a precursor of the oxide, the total amount of the dopant element(s) being from 0.1 to 0.3 mol % on the basis of the quantity of the basic mixture, (C) at least one improving additive selected from a source of Mn and a source of Cu, the total amount of the improving additive(s) being such that the total amount of Mn and Cu is not more than 0.06 mol % on the basis of the quantity of the basic mixture with proviso that the amount of Mn is not more than 0.025 mol % on the same basis, and (D) another improving additive which is $SiO_2$ and amounts to 0.1-2.0 mol % on the basis of the quantity of the basic mixture.

In this powder composition, the $BaTiO_3$ powder and the $SrTiO_3$ powder must satisfy the following requirements, respectively. In the $BaTiO_3$ powder, the primary particles of the powder are not larger than 0.2 $\mu$m and agglomerate so as to constitute secondary particles which have open pores and have a mean particle size in the range from 150 to 250 $\mu$m on condition that at least 95 wt % of the secondary particles are larger than 50 $\mu$m. In the $SrTiO_3$ powder, the primary particles of the powder are not larger than 0.1 $\mu$m and agglomerate so as to constitute secondary particles which have open pores and have a mean particle size in the range from 70 to 180 $\mu$m, and the $SrTiO_3$ powder is in the range from 20 to 30 m$^2$/g in specific surface area measured by the BET adsorption method. Both the $CaTiO_3$ powder and the $PbTiO_3$ powder are required to be not larger than 2 $\mu$m in particle size.

The $BaTiO_3$ powder and the $SrTiO_3$ powder used in this invention are produced by calcining relatively coarse crystals of titanium oxyoxalate and strontium titanium oxypxalate, respectively, so that the secondary particles of each of these titanate powders are socalled skeleton particles retaining the shape of the crystals of the oxyoxalate.

Preferably the $PbTiO_3$ powder is produced by calcining relatively coarse crystals of lead titanium oxyoxalate to obtain a powder of which the primary particles are not larger than 0.2 $\mu$m and agglomerate so as to constitute secondary particles which have open pores and have a mean particle size in the range from 50 to 150 $\mu$m on condition that at least 95 wt % of the secondary particles are larger than 20 $\mu$m.

As the source of Mn it is suitable to use manganese oxide or manganese oxalate. As the source of Cu it is suitable to use copper oxide, copper sulfide or copper oxalate.

When a powder composition according to the invention contains both a source of Mn and a source of Cu, it is suitable that each of Mn and Cu amounts to at least 0.005 mol % on the basis of the quantity of the basic mixture of titanates. When only a source of Mn is used in combination with $SiO_2$ the amount of Mn should be at least 0.005 mol % on the same basis. When only a source of Cu is used in combination with $SiO_2$ the amount of Cu should be at least 0.02 mol % on the same basis.

Using a powder composition according to the invention, a modified barium titanate semiconductive ceramic having a positive temperature coefficient of resistance is produced by compacting the powder composition into a desired shape and sintering the compacted mixture in an oxidizing atmosphere at a temperature in the range from 1300° to 1400° C.

By using this invention it is possible to produce a modified barium titanate semiconductive ceramic which is lower than 10 $\Omega.cm$ in specific resistance at room temperature, higher than 50 V/mm in breakdown volatage and higher than 9%/°C. in positive temperature coefficient of resistance above the Qurie temperature.

The success in producing modified barium titanate ceramics having such good and well balanced characteristics is primarily attributed to the employment of titanate powders which are respectively produced by calcining corresponding oxyoxalates and have the above stated physical properties. These titanate powders can be obtained with very high purity such that the total content of impurity metals other than alkaline earth metals is less than 100 ppm. Therefore, it is easy to control the characteristics of the sintered ceramics by the addition of only very small amounts of selected additives to the basic mixture of titanate powders. Besides, sintering of the powder composition using the titanate powders produced from exyoxalates gives a ceramic body having a uniformly fine structure. For example, in the sintered ceramic structure the grains are smaller than 10 $\mu m$ with good uniformity and have a mean size of about 5 $\mu m$. By virtue of such a fine and uniform structure the ceramic is fairly high in breakdown voltage.

Besides, the physical properties of the titanate powders produced form oxyoxalates contribute to the good characteristics of the sintered ceramic. In these titanate powders the primary particles are uniformly very fine and agglomerate with adequate binding force to constitute skeleton particles as the secondary particles. These titanate powders are very good in mixability since mixing proceeds while the skeleton particles are gradually disintegrated. Therefore, a very uniformly mixed powder composition is obtained, and in the sintered ceramic body produced by sintering this powder composition every element is very uniformly distributed so that the ceramic body exhibits uniformly good characteristics in every region thereof.

In a modified barium titanate ceramic produced by using the present invention, Ca, Sr and Pb are jointly substituted for a part of Ba of barium titanate. As is known, the Curie temperature of barium titanate ceramic shifts to lower temperatures when Sr is singly introduced and to higher temperatures when Pb is singly introduced, and by jointly introducing Ca, Sr and Pb the ceramic becomes somewhat higher in breakdown voltage and better in endurance to a large inrush current.

In the present invention either Mn or Cu is introduced into the modified barium titanate ceramic mainly for the purpose of augmenting the positive temperature coefficient of resistance of the ceramic above the Curie temperature. When Mn and Cu are jointly introduced a synergetic effect is gained as will be described hereinafter. Together with Mn and/or Cu, $SiO_2$ is introduced mainly for the purpose of reducing the dependence of the specific resistance of the ceramic on the amount of the dopant element and also for lowering the specific resistance at room temperature. According to the invention the addition of only very small amounts of $SiO_2$ and either Mn or Cu produces remarkable effects. Probably this is because of very uniform dispersion of the additives in the basic mixture using titanate powders produced by calcining oxyoxalates.

The semiconductive ceramics produced by the present invention serve as PTC resistors of thermistors for use as self-regulating constant temperature heater elements, current limiting elements, temperature controlling elements, etc., which may be operated at relatively low voltages supplied from batteries or the like.

DESCRIPTION OF THE PREFERRED EMBODIMENTS

Figure 1:
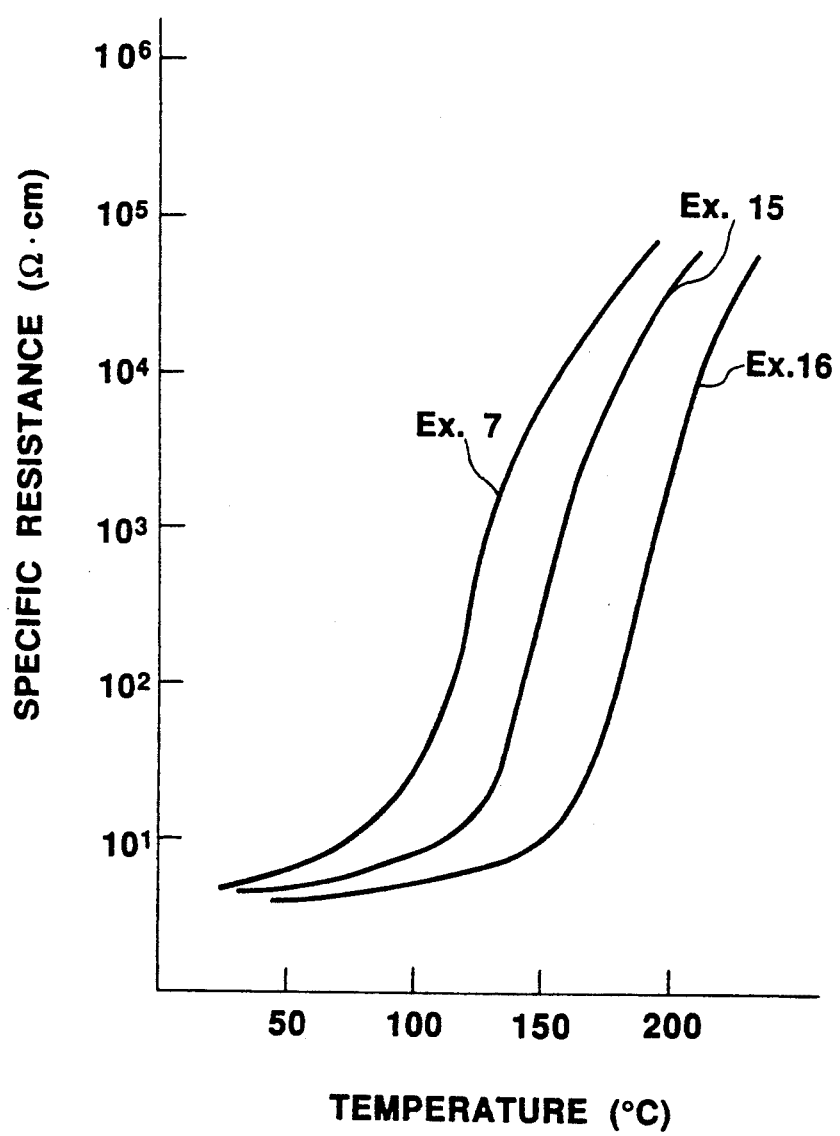
FIG. 1 is a graph showing the temperature-resistance characteristics of three different examples of semiconductive ceramics produced by a method according to the invention.

For producing a titanate powder for use in this invention by calcining an oxalate, the oxalate is required to be in the form of relatively coarse crystals almost uniform in shape and size, very high in purity and very close to 1 in the molar ratio of Ti to the other metal, viz. Ba, Sr, Pb or Ca, in every crystal. Therefore, the raw materials for the oxalate such as oxalic acid, titanium tetrachloride and a salt of Ba, Sr, Pb or Ca are required to have very high purity. To avoid the intrusion of metallic impurities from the reaction vessel it is preferable to use a reaction vessel made of or lined with an acid resistant plastic such as polytetrafluoroethylene. It is preferred to obtain an oxalate lower than 10 ppm in the content of any impurity metal other than alkaline earth metals and lower than 100 ppm in the total content of impurity metals.

Barium titanium oxyoxalate $BaTiO(C_2O_4)_2.4H_2O$ having the desired properties can be prepared by the following method.

In short, the aimed oxalate is formed by adding an aqueous mixed solution of titanium tetrachloride and barium chloride to an aqueous solution of oxalic acid. When the mixing of the two solutions is completed it is desirable that the concentration of the reaction product, $BaTiO(C_2O_4)_2.4H_2O$, in the reaction liquid falls in the range from 10 to 12 wt %. Insofar as this desire is satisfied, the concentrations of the initial solutions are arbitrary. However, in the solution of titanium tetrachloride and barium chloride the concentration of barium chloride is limited to 10 wt % at the maximum in order to prevent precipitation of barium chloride.

The solution of the titanium and barium salts should be prepared such that the Ba/Ti molar ratio in the solution falls in the range from 1.02 to 1.05. When the Ba/Ti molar ratio in this solution is lower than 1.02, the Ba/Ti molar ratio in the oxalate formed by the reaction becomes lower than 0.998. When the Ba/Ti molar ratio in the initial solution is above 1.05, a considerable amount of Ba remains unreacted though the Ba/Ti molar ratio in the obtained oxalate is sufficiently close to 1. It is suitable that the molar ratio of oxalic acid to Ti in the reaction liquid falls in the range from 2.1 to 2.3 with consideration of both the yield of the aimed oxalate and the economy of the reaction. It is suitable that the concentration of the oxalic acid solution is from 10 to 12 wt % for suppressing precipitation of unwanted salts and for precipitating desired crystals of the aimed oxalate.

Furthermore, the particle shape, particle size and the distribution of particle size of the crystal particles of $BaTiO(C_2O_4)_2.4H_2O$ formed by the reaction are greatly affected by the manner of adding the solution of titanium and barium salts to the oxalic acid solution, the efficiency of stirring of the resultant reaction liquid and the temperature of the reaction liquid. As to the manner of the addition it is suitable to introduce the solution of the titanium and barium salts into the oxalic acid solution such that the former solution showers down on a large area of the liquid surface of the latter solution in order to rapidly and widely disperse the former solution in the latter solution. Otherwise, undesirably fine crystals of the oxyoxalate precipitate. The solution of the titanium and barium salts should be added to the oxalic acid solution slowly and gradually in order to prevent precipitation of fine crystals of the oxyoxalate. For the same purpose, during the addition of the former solution the latter solution needs to be efficiently stirred. Although an optimum condition of stirring is variable depending on the shape and size of the reaction vessel, in the case of using a stirrer of an impeller type it is necessary that the peripheral speed of the stirrer blades is not lower than 2.5 m/sec.

The temperature of the reaction liquid and the degree of fluctuations of the liquid temperature greatly affect the physical and chemical properties of the crystallized oxyoxalate. It is necessary to maintain the reaction liquid at a constant temperature chosen within the range from 55° to 75° C. If the liquid temperature is below 55° C. the precipitated crystals of the oxyoxalate are not very good in crystallinity, and the Ba/Ti molar ratio in the crystals becomes lower than 0.998. If the liquid temperature is above 75° C. the precipitated crystals are inferior in stability and liable to lose in the content of Ba so that the Ba/Ti molar ratio becomes lower than 0.998 when a relatively long time elapses before the filtration operation. If the liquid temperature fluctuates the precipitated crystals become inferior in uniformity.

When the reaction is carried out under the above conditions the precipitated crystals of barium titanium oxyoxalate have a mean particle size larger than 100 μm with narrow distribution of particle size, and the individual crystals are stoichiometrically uniform from the surface to the core. The Ba/Ti molar ratio in the crystals is within the very narrow range of from 0.998 to 1.002.

Strontium titanium oxyoxalate $SrTiO(C_2O_4)_2.5H_2O$ having the desired properties can be prepared by the following method.

In short, the aimed oxalate is formed by adding an aqueous mixed solution of titanium tetrachloride and strontium chloride to an aqueous solution of oxalic acid.

The solution of the titanium and strontium salts should be prepared such that the Sr/Ti molar ratio in the solution is not lower than 1.2, because in strontium titanium oxyoxalate the Sr/Ti molar ratio tends to become lower than 1. When the Sr/Ti molar ratio in this solution is lower than 1.2, the Sr/Ti molar ratio in the oxalate formed by the reaction becomes lower than 0.998. However, it is uneconomical to make the Sr/Ti ratio in the solution excessively high. Usually it is suitable that the Sr/Ti molar ratio in the solution falls in the range from 1.2 to 1.3. It is suitable that the molar ratio of oxalic acid to Ti in the reaction liquid falls in the range from 2.1 to 2.3 with consideration of both the yield of the aimed oxalate and the economy of the reaction. It is suitable that the concentration of the oxalic acid solution is from 10 to 14 wt % for suppressing precipitation of unwanted salts and for precipitating desired crystals of the aimed oxalate.

The particle shape, particle size and the distribution of particle size of the crystal particles of $SrTiO(C_2O_4)_2.5H_2O$ formed by the reaction are greatly affected by the manner of adding the solution of titanium and strontium salts to the oxalic acid solution, the efficiency of stirring of the resultant reaction liquid and the temperature of the reaction liquid. Therefore, the solution of the titanium and strontium salts is slowly and gradually introduced into the oxalic acid solution by the showering method described hereinbefore, while efficiently stirring the resultant reaction liquid. Although an optimum condition of stirring is variable depending on the shape and size of the reaction vessel, in the case of using a stirrer of an impeller type it is necessary that the peripheral speed of the stirrer blades is not lower than 3.0 m/sec.

The temperature of the reaction liquid and the degree of fluctuations of the liquid temperature greatly affect the physical and chemical properties of the crystallized oxyoxalate. It is necessary to maintain the reaction liquid at a constant temperature chosen within the range from 60° to 80° C. If the liquid temperature is below 60° C. or above 60° C. the precipitated crystals of the oxyoxalate are not very good in crystallinity, and the Ba/Ti molar ratio in the crystals becomes lower than 0.998. If the liquid temperature is above 75° C. the Sr/Ti molar ratio in the product is liable to become 0.998 for the reasons explained with respect to the preparation of barium titanium oxyoxalate.

When the reaction is carried out under the above conditions the precipitated crystals of strontium titanium oxyoxalate have a mean particle size larger than 70 μm with narrow distribution of particle size, and the individual crystals are stoichiometrically uniform from the surface to the core. The Sr/Ti molar ratio in the crystals is within the very narrow range of from 0.998 to 1.002.

When strontium titanium oxyoxalate is precipitated at a temperature in the range from 60° to 80° C. the yield of the oxyoxalate is about 80%, which is a relatively low value from an industrial point of view. It is possible to increase the yield of the oxyoxalate up to about 90% by cooling the reaction liquid after completing the reaction. However, the rate of cooling should be within the range from 5° to 30° C./hr because the Sr/Ti molar ratio in the oxyoxalate precipitated by the cooling depends on the rate of cooling.

Calcium titanium oxyoxalate can be formed by adding an aqueous mixed solution of titanium tetrachloride and calcium chloride to an aqueous solution of oxalic acid. It is possible to precipitate desirably coarse and uniform crystals of calcium titanium oxyoxalate in which the Ca/Ti molar ratio is very close to 1 by substantially the same method and under nearly the same conditions as in the precipitation of crystals of strontium titanium oxyoxalate.

Lead titanium oxyoxalate $PbTiO(C_2O_4)_2 \cdot 4H_2O$ having the desired properties can be prepared by the following method.

In this case it is impossible to use a mixed solution of titanium tetrachloride and a lead salt because lead chloride precipitates from such a solution. Therefore, at first titanium tetrachloride alone is dissolved in water, and the solution is neutralized with aqueous ammonia to form a gel of titanium hydroxide. The gel is separated from the mother liquor by filtration, washed with water and then dissolved in oxalic acid, and the concentration of the resultant solution is suitably adjusted by using water. In this solution the molar ratio of oxalic acid to Ti should fall in the range in the range from 2.1 to 2.3, and the content of titanium ion should not exceed 4 wt %.

Lead titanium oxyoxalate is formed by adding the solution containing titanium ion and oxalic acid to an aqueous solution of lead nitrate. To precipitate desirable coarse and uniform crystals of lead titanium oxyoxalate, the concentrations of the respective solutions are adjusted such that when the mixing of the two solutions are completed the concentration of the oxyoxalate in the reaction liquid falls in the range from 10 to 18 wt %. To obtain an oxyoxalate in which the Pb/Ti molar ratio is very close to 1, it is necessary that the molar ratio of Pb in the lead nitrate solution to Ti in the titanium salt solution is in the range from 1.01 to 1.03. If the Pb/Ti molar ratio in the two solutions is below 1.01 the Pb/Ti molar ratio in the obtained oxalate becomes lower than 0.99. If the Pb/Ti molar ratio in the solutions is above 1.03 the Pb/Ti molar ratio in the oxalate becomes higher than 1.01.

The properties of the crystals of $PbTiO(C^2O_4)_2 \cdot 4H_2O$ formed by the reaction are greatly affected by the manner of adding the solution of titanium salt in oxalic acid to the lead salt solution, the efficiency of stirring the resultant reaction liquid and the temperature of the reaction liquid. Therefore, the titanium salt solution is slowly and gradually introduced into the lead salt solution by the showering method described hereinbefore, while efficiently stirring the resultant reaction liquid. In the case of using a stirrer of an impeller type it is necessary that the peripheral speed of the stirrer blades is not lower than 2.0 m/sec. The reaction liquid should be maintained at a constant temperature chosen within the range from 45° to 55° C. If the liquid temperature is lower than 45° C. or higher than 55° C. the Pb/Ti molar ratio in the precipitated oxyoxalate crystals becomes lower than 0.99.

When the reaction is carried out under the above described conditions the precipitated crystals of lead titanium oxyoxalate have a mean particle size larger than 50 $\mu$m with narrow distribution of particle size, and the individual crystals are stoichiometrically uniform from the surface to the core. The Pb/Ti molar ratio in the crystals is within the very narrow range from 0.998 to 1.002.

In each of the oxyoxalates obtained by the above described methods the proton of the organic acid is substituted by metals or metal oxides. By calcining the oxyoxalate in an atmosphere containing sufficient oxygen such as air the residue of the organic acid is decomposed and oxidized, whereby a powder of a titanate such as $BaTiO_3$, $SrTiO_3$, $PbTiO_3$ or $CaTiO_3$ is obtained. The calcination is carried out at a temperature somewhat lower than the temperature at which sintering of the titanate begins. The properties of the obtained titanate powder such as mean particle size, distribution of particle size and the molar ratio of Ti to the other metal are greatly affected by the characteristics of the crystals of the oxyoxalte.

In the present invention powders of $BaTiO_3$, $SrTiO_3$, $CaTiO_3$ and $PbTiO_3$ are essential and basic materials. When a modified barium titanate ceramic is produced by using these basic materials the electrical characteristics of the ceramic depend greatly on the properties of the titanate powders, and particularly on the properties of the $BaTiO_3$ and $SrTiO_3$ powders. In the present invention it is necessary to use $BaTiO_3$ and $SrTiO_3$ powders respectively prepared from the corresponding oxyoxalates, and it is preferable to use a $PbTiO_3$ powder prepared from lead titanium oxyoxalate. However, it is also possible to use a $PbTiO_3$ powder prepared by a usual solid phase method such as the high temperature reaction between $Pb_3O_4$ and $TiO_2$ insofar as the titanate powder is sufficiently high purity. It is not necessary to use a $CaTiO_3$ powder prepared from calcium titanium oxyoxalate, and there is no problem in using a $CaTiO_3$ powder prepared by a usual solid phase method such as the high temperature reaction between $CaCO_3$ and $TiO_2$ insofar as the titanate powder is sufficiently high in purity.

Any of $BaTiO_3$, $SrTiO_3$, $PbTiO_3$ and $CaTiO_3$ powders obtained by calcining the corresponding oxyoxalates is comprised of so-called skeleton particles retaining the shape of the individual crystal particles of the oxyoxalate. Each of the skeleton particles is constituted of a large number of uniformly fine primary particles which are smaller than about 0.2 $\mu$m and are bonding to each other in a very lightly sintered state, and in each skeleton particle the atomic distribution is very uniform. By using titanate powders of such a structure in a usual sintering process it is possible to obtain a semiconductive ceramic which is very uniform in structure, sufficiently low in specific resistance at normal temperature, fairly high in breakdown voltage and, above the Curie temperature, has a very high positive temperature coefficient of resistance.

In preparing any of the above described oxyoxalates the drying of the oxyoxalate crystals is made at a temperature not high enough to expel the water of hydration, so that the dried oxyoxalate is in the state of a hydrate salt. The oxyoxalate in such a state is calcined at a temperature suitable for decomposing the organic residue of the oxyoxlate without causing carbonization and for maintaining the coarseness of the calcined particles. The calcination must be carried out in an oxygen containing atmosphere, but the concentration of oxygen in the calcining atmosphere does not need to be very high because in an atmosphere very rich in oxygen the oxyoxalate might undergo sudden decomposition and combustion.

In the case of calcining barium, strontium or calcium titanium oxyoxalate a suitable range of the calcining temperature is from 700° to 900° C. If the temperature is below 700° C. it is likely that the decomposition and oxidation of the oxyoxalate remain incomplete so that the obtained titanate powder contains residual carbon. If the calcining temperature is above 900° C. it is often that nonuniform growth of particles occurs to result in local and abnormal growth of particles.

In the case of calcining barium titanium oxyoxalate or calcium titanium oxyoxalate it is possible to obtain a $BaTiO_3$ or $CaTiO_3$ powder comprised of skeleton secondary particles which are desirably coarse and uniform in size. Each of the skeleton secondary particles is an agglomeration of primary particles, which are smaller than about 0.2 μm and are bonding to each other, and has open pores. When the synthesis and calcination of the oxyoxalate are carried out under optimum conditions the secondary particles of the titanate powder have a mean particle size of 150-250 μm, and the powder has a BET specific surface area of 6 to 10 $m^2/g$, and the amount of the secondary particles not larger than 50 μm is not more 5 wt% of the powder. In the case of calcining strontium titanium oxyoxalte it is possible to obtain a $SrTiO_3$ powder comprised of skeleton secondary particles which have a mean particle size of 70-180 μm. Also in this case each of the secondary particles is an agglomeration of primary particles, which are smaller than about 0.1 μm and are bonding to each other, and has open pores. The BET specific surface area of the $SrTiO_3$ powder depends greatly on the conditions of the preparation of the oxyoxalate, but it is possible to obtain a powder having a BET specific surface area in the range from 20 to 30 $m^2/g$ and not containing more than 5 wt % of secondary particles not larger than 40 μm.

Compared with barium, strontium or calcium titanium oxyoxalate, lead titanium oxyoxalate decomposes at a relatively low temperature and is susceptible to growth of particles. Therefore, it is suitable to calcine lead titanium oxyoxalate at a temperature in the range from 600° to 800° C. If the temperature is below 600° C. it is likely that the decomposition and oxidation of the oxyoxalate remain incomplete so that the obtained titanate powder contains residual carbon. If the calcining temperature is above 800° C. it is often that nonuniform growth of particles occurs to result in local and abnormal growth of particles. It is possible to obtain a $PbTiO_3$ powder comprised of skeleton secondary particles which are desirably coarse and uniform in size. Each of the skeleton secondary particles is an agglomeration of primary particles, which are smaller than about 0.2 μm and are bonding to each other, and has open pores. When the synthesis and calcination of the oxyoxalate are carried out under optimum conditions the secondary particles of the titanate powder have a mean particle size of 50-150 μm, and the powder has a BET specific surface area of 6 to 10 $m^2/g$, and the amount of the secondary particles not larger than 20 μm is not more 5 wt % of the powder.

In the case of using a $PbTiO_3$ powder prepared from inorganic compounds and/or a $CaTiO_3$ powder prepared from inorganic compounds, the powder(s) need to be nearly equivalent to the other titanate powders prepared from oxyoxalates in mean particle size and also in purity. That is, the $PbTiO_3$ powder and/or the $CaTiO_3$ powder need to be smaller than about 2 μm in mean particle size and lower than 100 ppm in the total content of impurity metals other than alkaline earth metals.

The basic part of a powder composition according to the invention is a mixture of 1-20 mol % of $SrTiO_3$, 5-20 mol % of $CaTiO_3$, 1-20 mol % of $PbTiO_3$ and the balance of $BaTiO_3$ with proviso that $BaTiO_3$ amounts to 45-85 mol %.

If this mixture of titanates contains only less than 45 mol % of $BaTiO_3$ it is difficult to produce a semiconductive ceramic by using the powder composition, and the obtained ceramic has an undesirably high specific resistance at room temperature. If $BaTiO_3$ amounts to more than 85 mol % of the mixture it is difficult to produce a ceramic having good electrical properties. If $SrTiO_3$ is less than 1 mol % of the mixture the sintering of the powder composition suffers from coarsening of the sintered grains, and the effect of the Sr substitution on the electrical characteristics of the sintered ceramic is inappreciable. If $SrTiO_3$ amounts to more than 20 mol % of the mixture the sintering of the powder composition suffers from unwanted local growth of grains, and hence the obtained ceramic is inferior in electrical characteristics. If $CaTiO_3$ is less than 5 mol % or more than 20 mol % of the mixture it is difficult to produce a semiconductive ceramic sufficiently high in breakdown voltage. If $PbTiO_3$ is less than 1 mol % of the mixture the effect of the Pb substitution on the electrical characteristics of the sintered ceramic is almost inappreciable. If the mixture contains more than 20 mol % of $PbTiO_3$ good sintering of the powder composition is difficult because of dissipation of a considerable amount of Pb or its oxide during the sintering operation, and it is difficult to produce a semiconductive ceramic.

To produce a semiconductive ceramic having desired characteristics with good reproducibility, it is desirable to prepare the mixture of the four kinds of titanates with consideration of the molar ratio of the divalent metal to Ti in each titanate such that in the obtained mixture the molar ratio of the total of Ba, Sr, Ca and Pb to Ti falls in the range from 0.99 to 1.03.

To produce a modified barium titanate ceramic having semiconductivity it is necessary to use a dopant such as a rare earth element. A powder composition according to the invention contains at least one of Sb, Nb and rare earth elements in the form of either oxide or a compound that serves as a precursor of oxide. The total amount of the dopant element(s) is limited within the range from 0.1 to 0.3 mol % of the total of the above described four kinds of titanates. If the amount of the dopant element(s) is less than 0.1 mol % of the titanate mixture it is difficult to afford good semiconductivity to the sintered ceramic. If the amount of the dopant element(s) is more than 0.3 mol % of the titanate mixture the sintered ceramic becomes undesirably high in specific resistance at room temperature. It is preferable that the amount of the dopant element(s) is not more than 0.28 mol %. Usually it suffices to employ only one kind of dopant element which is preferably selected from Sb, Nb, Y, La and Ce, and it is preferred to use an oxide or oxalate of the selected element in preparing a powder composition to be sintered.

Besides the dopant, a source of Mn or a source of Cu, or a combination of a Mn source and a Cu source, and $SiO_2$ are added to the basic mixture of the titanates as special additives to improve the temperature-resistance characteristics of the semiconductive ceramic to be produced.

Both Mn and Cu has the effect of greatly enhancing the positive temperature coefficient of resistivity of the semiconductive ceramic produced by using this invention at temperatures above the Curie temperature of the ceramic. Besides, Mn has the effect of enhancing the withstand voltage of the ceramic. Herein the temperature coefficient of resistance, $\alpha$, is defined as follows.

$$\alpha = \frac{2.303 \times \log(R_2/R_1)}{T_2 - T_1} \times 100(\%/°C.)$$

where $T_1$ is the Qurie temperature of the semiconductive ceramic, $T_2 = T_1 + 50°$ C., $R_1$ is the resistance of the ceramic at $T_1$, and $R_2$ is the resistance at $T_2$.

On the basis of the quantity of the basic mixture of the four kinds of titanates, up to 0.03 mol % of Mn or up to 0.06 mol % of Cu can be added together with 0.1-2.0 mol % of $SiO_2$. When both Mn and Cu are added the total amount of Mn and Cu is limited to 0.06 mol % at the maximum with proviso that the amount of Mn does not exceed 0.025 mol %. Mn is added in the form of oxide or oxalate, and Cu is added in the form of oxide, sulfide or oxalate.

When Cu is not added, it is suitable to add at least 0.005 mol % of Mn. If the amount of Mn is less than 0.005 mol % the semiconductive ceramic is low in the value of the coefficient $\alpha$, and the ceramic is relatively low in breakdown voltage. If the amount of Mn exceeds 0.025 mol % the ceramic becomes relatively high in specific resistance at room temperature and hence unsuitable for use with application of low voltages, although the value of $\alpha$ is high.

When Mn is not added, it is suitable to add at least 0.02 mol % of Cu. If the amount of Cu is less than 0.02 mol % the semiconductive ceramic is low in the value of $\alpha$, and the ceramic is relatively low in breakdown voltage. If the amount of Cu exceeds 0.06 mol % the ceramic becomes low in breakdown voltage, though the value of $\alpha$ becomes high.

In the case of adding both Mn and Cu it is suitable to add at least 0.005 mol % of Mn and at least 0.005 mol % of Cu, and it is preferable that the amount of Cu is not more than 0.03 mol %.

$SiO_2$ serves the purposes of improving the sinterability of the powder composition, suppressing a change in the specific resistance of the obtained ceramic with a slight change in the amount of addition of the dopant and enhancing the withstand voltage of the ceramic. It is suitable to use a fine powder of $SiO_2$. If the amount of $SiO_2$ is less than 0.1 mol % on the basis of the total of the four kinds of titanates the sintering of the powder composition is liable to suffer from unwanted growth of grains, and the obtained ceramic is relatively low in breakdown voltage and also in the value of $\alpha$. If the amount of $SiO_2$ exceeds 2.0 mol % the ceramic becomes relatively high in specific resistance at room temperature. In most cases it is suitable to limit the amount of $SiO_2$ within the range from 0.5 to 1.0 mol %.

A powder composition according to the invention is prepared by thoroughly disintegrating and mixing the powders of the basic titanates and additives with care to prevent intrusion of metal impurities into the mixture. For example, it is suitable to use a ball mill made up of a synthetic resin pot and zirconia balls, i.e. balls made of a nonmetallic material which is sufficiently high in density and, even if a trace thereof intrudes into the powder composition, does not adversely affect the electrical characteristics of the ceramic produced from the powder composition. To enhance the disintegrating efficiency the mixing may be performed with addition of water or an organic liquid to the powder materials. After completion of the mixing operation the added liquid is removed.

Using a powder composition according to the invention a semiconductive ceramic is produced by a conventional sintering process. First, the powder composition is compacted in a mold into a so-called green body of a desired shape under a pressure of 300 to 1000 $kg/cm^2$. According to the need a small amount of an organic binder may be added to the powder composition, and optionally the powder composition may be granulated to facilitate the compacting operation. If the compacting pressure is too low the sintered ceramic has a high specific resistance. If the pressure is too high the sintered ceramic is relatively low in the value of the coefficient $\alpha$, though the specific resistance becomes low. The green body is sintered in an oxidizing atmosphere, which may be the air. In the sintering operation the temperature is raised at a rate of 5° to 10° C./min up to a predetermined temperature in the range from 1300° to 1400° C., and that temperature is maintained for about 5 min to about 2 hr depending on the size of the green body. If the green body is heated too slowly the sintered ceramic has a relatively high specific resistance. If the green body is heated too rapidly the sintered ceramic becomes relatively low in the value of the coefficient $\alpha$, though the specific resistance becomes low. When the sintering temperature is outside the aforementioned range the obtained ceramic is relatively high in specific resistance. After that the temperature is lowered at a rate of 5° to 10° C./min. Usually the sintered ceramic body has a density of 5.2 to 5.6 $g/cm^3$.

REFERENTIAL EXAMPLE 1

Barium titanium oxyoxalate was prepared by the following process.

First $TiCl_4$ was dissolved in water to obtain a solution containing 27.6 wt % of Ti ion calculated as $Ti(OH)_4$ and 32.8 wt % of Cl ion calculated as HCl.

In a rubber lined tank having a capacity of 5 $m^3$ (tank A), 650 kg of the above titanium salt solution was slowly mixed with 389 kg of $BaCl_2.2H_2O$ and 2980 kg of pure water to dissolve the barium salt and obtain a uniformly mixed solution. In the mixed solution the concentration of $BaCl_2$ was 8.25 wt %, and the Ba/Ti molar ratio was 1.03.

In another rubber lined tank having a capacity of 7 $m^3$ (tank B), 429 kg of oxalic acid was dissolved in 2055 kg of pure water, and the solution was kept heated at 60° C. The molar ratio of the oxalic acid in the tank B to Ti in the solution in the tank A was 2.2.

A pipe having about 200 small apertures in an end section was extended from the tank A to the tank B such that the apertured end section was above the liquid surface in the tank B. The tank B was provided with a stirrer of an impeller type having two blades in the form of flat plate. While operating the stirrer at a rate of 50 rpm to keep a peripheral speed of 2.9 m/sec, the mixed solution in the tank A was gradually fed to the tank B by operating a charge pump. By the apertures in the end section of the pipe the mixed solution showered down on the liquid surface in the tank B. The liquid temperature in the tank B was maintained at 60° C., and it took 4 hr to feed the entire quantity of the solution in the tank A into the solution in the tank B.

In this process the initial solutions in the tanks A and B were prepared such that at the end of the reaction the concentration of the reaction product, viz. barium titanium oxyoxalate, in the reaction liquid was about 11 wt %.

After the above reaction the precipitated reaction product was separated from the reaction liquid with a centrifuge, washed and dried at 50° C. As the result 592 kg of $BaTiO(C_2O_4)_2.4H_2O$ in the form of relatively coarse crystals was obtained. The yield was calculated to be 85.3% on the weight basis. By analysis the Ba/Ti molar ratio in the obtained oxyoxalate was 0.999.

Figure 2:
FIG. 2 is a scanning electron microscope photograph of a barium titanate powder obtained by calcining barium titanium oxyoxalate.
Figure 3:
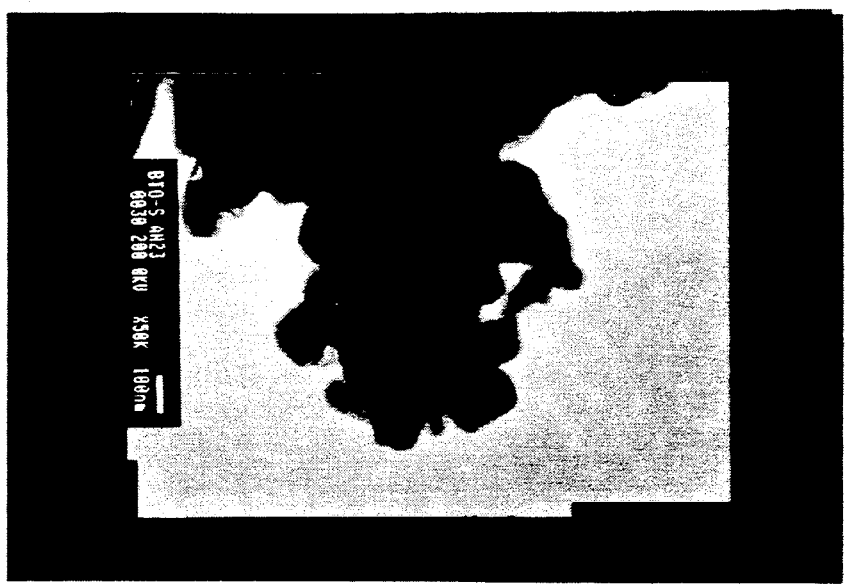
FIG. 3 is a transmission electron microscope photograph of the same powder.

Next, barium titanium oxyoxalate prepared by the above process was put into a refractory ceramic crucible and calcined in air at 900° C. for 2 hr. As the result a powder of $BaTiO_3$ was obtained. In this powder the content of any impurity metal other than alkaline earth metals was below 10 ppm. The powder was comprised of skeleton secondary particles having a mean particle size of about 200 $\mu$m, and the amount of secondary particles not larger than 50 $\mu$m was about 2 wt % by measurement with a particle size distribution analyzer of laser beam type (PRO-7000 of Seishin Kigyo Co.). The powder had a BET specific surface area of 8.0 $m^2/g$ by measurement with an automatic instrument of gas flow type (Micromeritic Flowsop II, Model 2300 of Shimadzu Seisakusho Co.). FIG. 2 is a scanning electron microscope photograph of the secondary particles of this $BaTiO_3$ powder, and FIG. 3 is a transmission electron microscope photograph of the same powder showing the manner of agglomeration of the primary particles.

REFERENTIAL EXAMPLE 2

Strontium titanium oxyoxalate was prepared by the following process.

First $TiCl_4$ was dissolved in water to obtain a solution containing 39.9 wt % of Ti ion calculated as $Ti(OH)_4$ and 31.9 wt % of Cl ion calculated as HCl.

In the tank A used in Referential Example 1, 449 kg of the above titanium salt solution was slowly mixed with 516 kg of $SrCl_2.6H_2O$ and 1590 kg of pure water to dissolve the strontium salt and obtain a uniformly mixed solution. In the mixed solution the concentration of $SrCl_2$ was 12.0 wt %, and the Sr/Ti molar ratio was 1.25.

In the tank B used in Referential Example 1, 429 kg of oxalic acid was dissolved in 2147 kg of pure water, and the solution was kept heated at 75° C. The molar ratio of the oxalic acid in the tank B to Ti in the solution in the tank A was 2.2.

In the tank B the stirrer was revolved so as to keep a peripheral speed of 4.1 m/sec, and the mixed solution in the tank A was gradually fed into the tank B as a shower from the apertures of the pipe. The liquid temperature in the tank B was maintained at 75° C., and it took 2.5 hr to feed the entire quantity of the solution in the tank A into the solution in the tank B.

In this process the initial solutions in the tanks A and B were prepared such that at the end of the reaction the concentration of the reaction product, viz. strontium titanium oxyoxalate, in the reaction liquid was about 12 wt %.

After the above reaction the precipitated reaction product was separated from the reaction liquid with a centrifuge, washed and dried at 50° C. As the result 600 kg of $SrTiO(C_2O_4)_2.5H_2O$ in the form of relatively coarse crystals was obtained. The yield was calculated to be 93% on the weight basis. By analysis the Sr/Ti molar ratio in the obtained oxyoxalate was 0.999.

Next, strontium titanium oxyoxalate prepared by the above process was put into a refractory ceramic crucible and calcined in air at 900° C. for 2 hr. As the result a powder of $SrTiO_3$ was obtained. In this powder the content of any impurity metal other than alkaline earth metals was below 10 ppm. The powder was comprised of skeleton secondary particles having a mean particle size of about 150 $\mu$m, and the amount of secondary particles not larger than 50 $\mu$m was about 2.5 wt %. The powder had a BET specific surface area of 26.0 $g/m^2$.

REFERENTIAL EXAMPLE 3

Lead titanium oxyoxalate was prepared by the following process.

First $TiCl_4$ was dissolved in water to obtain 10 wt % solution. This solution was neutralized by adding aqueous solution of ammonia until pH of the solution reached 7 while cooling the solution to keep the temperature at or below 40° C. By this treatment a gel of $Ti(OH)_4$ was formed. The gel was separated from the mother liquor by filtration, washed with pure water and soon dissolved in oxalic acid. Measuring the concentration of Ti ion in the solution, pure water and oxalic acid were carefully added to the solution so as to adjust the concentration of Ti ion to 2.4 wt % and the molar ratio of oxalic acid to Ti to 2.15. Then 2378 kg of the thus adjusted oxalic acid solution of titanium hydroxide was charged in a rubber lined tank having a capacity of 7 $m^3$ (tank C).

In another rubber lined tank having a capacity of 5 $m^3$ (tank D) 402 kg of $Pb(NO_3)_2$ was dissolved in 1086 kg of pure water. The molar ratio of Pb in the solution in the tank D to Ti in the solution in the tank C was 1.02.

The tank D was provided with a stirrer of an impeller type having two blades in the form of flat plate. A pipe having about 200 apertures in an end section was extended from the tank C to the tank D such that the apertured end section was above the liquid surface in the tank D. The stirrer was revolved to keep a peripheral speed of 2.0 m/sec, and through the aforementioned pipe the titanium hydroxide solution in the tank C was gradually fed into the solution in the tank D. By the apertures in the end section of the pipe the titanium hydroxide solution showered down on the liquid surface in the tank D. The liquid temperature in the tank D was maintained at 50° C., and it took 2.0 hr to feed the entire quantity of the solution in the tank C into the solution in the tank D.

In this process the initial solutions in the tanks C and D were prepaed such that at the end of the reaction the concentration of the reaction product, viz. lead titanium oxyoxalate, in the reaction liquid was about 16 wt%.

After the above reaction the precipitated reaction product was separated from the reaction liquid with a centrifuge, washed and dried at 50° C. As the result $PbTiO(C_2O_4)_2.4H_2O$ in the form of relatively coarse crystals was obtained. The yield was calculated to be 97.0% on the weight basis. By analysis the Pb/Ti molar ratio in the obtained oxyoxalate was 0.998.

Next, lead titanium oxyoxalte prepared by the above process was put into a refractory ceramic crucible and calcined in air at 900° C. for 2 hr. As the result a powder of $PbTiO_3$ was obtained. In this powder the content of any impurity metal other than alkaline earth metals was below 10 ppm. The powder was comprised of skeleton secondary particles having a mean particle size of about 140 μm, and the amount of secondary particles not larger than 50 μm was about 3 wt%. The powder had a BET specific surface area of 8.0 m$^2$/g.

EXAMPLE 1

As the basic materials for producing a modified barium titanate ceramic, the powders of $BaTiO_3$, $SrTiO_3$ and $PbTiO_3$ prepared in Referential Examples 1, 2 and 3, respectively, and a $CaTiO_3$ powder prepared by solid phase reaction of $CaCO_3$ with $TiO_2$ were used. The $CaTiO_3$ powder was less than 10 ppm in the content of any impurity metal other than alkaline earth metals and had a mean particle size of 0.5 μm.

La was employed as a dopant to afford semiconductivity to the ceramic, and $La_2O_3$ powder smaller than 10 μm in particle size was used as the source of La. Furthermore, $SiO_2$ powder smaller than 10 μm in particle size and Mn in the form of a manganese oxalate powder smaller than 10 μm in particle size were employed as special additives.

The powdery materials were mixed together in the proportions shown in Table 1, and a small amount of an organic binder was added to the mixture. The percentages of $La_2O_3$, Mn ($MnC_2O_4$) and $SiO_2$ are on the basis of the total of the basis materials (titanates), respectively. In a ball mill using a polyethylene pot and zirconia balls ethanol was added to the mixture, and wet mixing was carrier out for 24 hr. After that the mixture was dried and granulated.

The granulated composition was press molded by application of a pressure of 1000 kg/cm$^2$ into a green body in the shape of a disc. The green body was sintered in air by raising the temperature up to 1350° C. at a rate of about 8° C./min and maintaining the temperature of 1350° C. for 2 hr. The sintered ceramic was in the shape of a disc 13 mm in diameter and 2.5 mm in thickness. A pair of ohmic contantact electrodes of In-Ga alloy were formed on the two opposite major surfaces of the sintered disc, respectively, to measure the Curie temperature, specific resistance at room temperature, temperature coefficient of resistance ($\alpha$) and withstand voltage of the sintered ceramic. The measurements are shown in Table 1. The relationship between temperature and resistance was measured with an ammeter while the temperature of each sample was gradually raised in a thermostatic oven. The withstand voltage means a maximal voltage which can be applied to the ceramic disc without causing breakdown. That is, the withstand voltage is slightly lower than the breakdown voltage.

EXAMPLES 2-16

In these examples the process of Example 1 was repeated, but the proportions of the basic materials and the amount of Mn (using manganese oxalate) or the amount of $SiO_2$ were variously changed as shown in Table 1. Furthermore, the dopant to afford semiconductivity to the sintered ceramic was changed to Sb (using $Sb_2O_3$) in Examples 11 and 12 and to Nb (using $Nb_2O_5$) in Example 13.

The PTC resistivity characteristics of the sintered ceramics of these examples were as shown in Table 1. With respect to the sintered ceramics of Examples 7, 15 and 16, FIG. 1 shows the temperature-resistance characteristics. The curves in FIG. 1 indicate that a semiconductive ceramic body produced by the present invention is fairly low in specific resistance at normal temperature and exhibits a very sharp increase in resistivity at temperatures above the Curie temperature and that the Curie temperature of the ceramic body can be chosen in a considerably wide range.

TABLE 1

| | Powder Composition | | | | | | | Sintered Ceramic | | | |
| | Basic Materials (mol %) | | | | Dopant Source (mol %) | Additives (mol %) | | Curie Temperature (°C.) | Specific Resistance (Ω.cm) | Temperature Coefficient, $\alpha$ (%/°C.) | Withstand Voltage (V/mm) |
| | $BaTiO_3$ | $SrTiO_3$ | $CaTiO_3$ | $PbTiO_3$ | | $MnC_2O_4$ | $SiO_2$ | | | | |
|---|---|---|---|---|---|---|---|---|---|---|---|
| Ex. 1 | 65 | 11 | 15 | 9 | $La_2O_3$: 0.10 | 0.025 | 0.5 | 100 | 4.0 | 11.0 | 85 |
| Ex. 2 | 83 | 2 | 13 | 2 | " | 0.015 | 0.5 | 121 | 7.2 | 9.5 | 60 |
| Ex. 3 | 80 | 5 | 13 | 2 | " | 0.015 | 0.5 | 112 | 7.1 | 9.5 | 62 |
| Ex. 4 | 75 | 10 | 13 | 2 | " | 0.015 | 0.5 | 97 | 5.5 | 10.0 | 75 |
| Ex. 5 | 68 | 15 | 15 | 2 | " | 0.006 | 0.5 | 82 | 5.2 | 9.5 | 70 |
| Ex. 6 | 68 | 15 | 15 | 2 | " | 0.010 | 0.5 | 82 | 5.4 | 10.0 | 75 |
| Ex. 7 | 68 | 15 | 15 | 2 | " | 0.020 | 0.5 | 82 | 6.0 | 10.4 | 83 |
| Ex. 8 | 68 | 15 | 15 | 2 | " | 0.025 | 0.5 | 82 | 7.3 | 10.9 | 83 |
| Ex. 9 | 68 | 15 | 15 | 2 | " | 0.020 | 0.1 | 82 | 5.3 | 11.3 | 70 |
| Ex. 10 | 68 | 15 | 15 | 2 | " | 0.020 | 1.0 | 82 | 7.3 | 10.2 | 86 |
| Ex. 11 | 65 | 8 | 12 | 2 | $Sb_2O_3$: 0.10 | 0.020 | 0.5 | 103 | 7.0 | 10.2 | 74 |
| Ex. 12 | 55 | 15 | 15 | 15 | " | 0.020 | 0.5 | 128 | 6.5 | 10.8 | 80 |
| Ex. 13 | 45 | 20 | 15 | 20 | $Nb_2O_5$: 0.10 | 0.020 | 0.5 | 130 | 7.4 | 10.8 | 83 |
| Ex. 14 | 63 | 15 | 20 | 2 | $La_2O_3$: 0.10 | 0.020 | 0.5 | 82 | 8.0 | 10.8 | 82 |
| Ex. 15 | 62 | 8 | 15 | 15 | " | 0.020 | 0.5 | 150 | 6.0 | 11.2 | 86 |
| Ex. 16 | 63 | 12 | 15 | 10 | " | 0.020 | 0.5 | 120 | 6.3 | 10.6 | 84 |

COMPARATIVE EXAMPLES 1-9

In these comparative examples, Example 1 of the invention was modified only in respect of the particulars of the method of preparing one of the basic materials. That is: in Comparative Examples 1-3 the conditions of the synthesis of barium titanium oxyoxalate in Referential Example 1 were changed as shown in Table 2-A; in Comparative Examples 4-6 the conditions of the synthesis of strontium titanium oxyoxalate in Referential Example 2 were changed as shown in Table 2-A; in Comparative Examples 7-9 the conditions of the synthesis of lead titanium oxyoxalate in Referential Example 3 were changed as shown in Table 2-A.

In Table 2-A, "showering" means the addition of the Ti-containing solution by the showering method employed in Referential Examples 1-3, and "injection" means the addition of the same solution by injecting from a single nozzle directed to a point in the liquid surface in the tank B or tank D.

The particulars of the titanate powders prepared and used in Comparative Examples 1-9 are shown in Table 2-B. The sintered ceramics of Comparative Examples 1-9 were subjected to the measurement of specific resistance at room temperature, temperature coefficient of resistance, α, and withstand voltage. The results are shown in Table 2-B.

COMPARATIVE EXAMPLES 10-22

The process of Example 1 was modified only in respect of the proportions of the basic materials and the amount of addition of Mn (as manganese oxalate), as shown in Table 3. Besides, in Comparative Example 19 the addition of $SiO_2$ was omitted. The basic materials used in these comparative examples were the same as in Example 1.

The characteristics of the sintered ceramics of Comparative Examples 10-22 were as shown in Table 3.

COMPARATIVE EXAMPLES 23 AND 24

As the basic materials, $BaCO_3$ powder, $SrCO_3$ powder, $CaCO_3$ powder, $Pb_3O_4$ powder and $TiO_2$ powder were used. These basic materials were mixed in the proportions corresponding to the proportions of titanates shown in Table 3, and $La_2O_3$ powder, $MnCO_3$ powder and $SiO_2$ powder were added to the mixture, as shown in Table 3. After that, the ceramic disc producing process of Example 1 was repeated. The characteristics of the ceramics of Comparative Examples 23 and 24 are also shown in Table 3.

TABLE 2-A

| | Oxalate to be Synthesized | Peripheral Speed of Stirrer Blades (m/sec) | Time Consumed in Adding Ti-containing Solution (hr) | Manner of the Addition of Solution |
|---|---|---|---|---|
| Comp. Ex. 1 | $BaTiO(C_2O_4)_2$ | 1.0 | 4 | showering |
| Comp. Ex. 2 | " | 2.5 | 1 | showering |
| Comp. Ex. 3 | " | 2.5 | 4 | injection |
| Comp. Ex. 4 | $SrTiO(C_2O_4)_2$ | 1.0 | 2 | showering |
| Comp. Ex. 5 | " | 3.0 | 1 | showering |
| Comp. Ex. 6 | " | 3.0 | 2 | injection |
| Comp. Ex. 7 | $PbTiO(C_2O_4)_2$ | 0.5 | 2 | showering |
| Comp. Ex. 8 | " | 2.0 | 0.5 | showering |
| Comp. Ex. 9 | " | 2.0 | 2 | injection |

TABLE 2-B

| | Titanate | Titanante Powder | | | | Sintered Ceramic | | |
|---|---|---|---|---|---|---|---|---|
| | | M/Ti Molar Ratio (M: Ba, Sr or Pb) | BET Surface Area ($m^2/g$) | Mean Particle Size (μm) | Particles Smaller than 50 μm (wt %) | Specific Resistance (Ω.cm) | Temperature Coefficient, α (%/°C.) | Withstand Voltage (V/mm) |
| Comp. Ex. 1 | $BaTiO_3$ | 1.000 | 9.6 | 200 | 18 | 8.3 | 10.8 | 53 |
| Comp. Ex. 2 | " | 0.998 | 9.2 | 110 | 10 | 6.5 | 9.6 | 55 |
| Comp. Ex. 3 | " | 0.998 | 9.7 | 150 | 32 | 12.5 | 8.4 | 45 |
| Comp. Ex. 4 | $SrTiO_3$ | 0.981 | 13 | 40 | 50 | 15.3 | 12.1 | 110 |
| Comp. Ex. 5 | " | 0.991 | 14 | 80 | 23 | 12.1 | 11.3 | 71 |
| Comp. Ex. 6 | " | 0.994 | 18 | 100 | 10 | 9.6 | 10.5 | 58 |
| Comp. Ex. 7 | $PbTiO_3$ | 1.011 | 7.8 | 30 | 60* | 18.3 | 14.0 | 50 |
| Comp. Ex. 8 | " | 1.007 | 8.1 | 50 | 45* | 12.5 | 12.2 | 55 |
| Comp. Ex. 9 | " | 1.005 | 8.3 | 75 | 20* | 8.4 | 11.5 | 60 |

*Particles smaller than 20 μm (wt %).

TABLE 3

| | Powder Composition | | | | | | | Sintered Ceramic | | | |
|---|---|---|---|---|---|---|---|---|---|---|---|
| | Basic Materials (mol %) | | | | Dopant Source (mol %) | Additives (mol %) | | Curie Temperature (°C.) | Specific Resistance (Ω.cm) | Temperature Coefficient, α (%/°C.) | Withstand Voltage (V/mm) |
| | $BaTiO_3$ | $SrTiO_3$ | $CaTiO_3$ | $PbTiO_3$ | | $MnC_2O_4$ | $SiO_2$ | | | | |
| Comp. Ex. 10 | 100 | 0 | 0 | 0 | $La_2O_3$: 0.10 | 0.020 | 0.5 | 120 | 5.6 | 4.1 | 30 |
| Comp. Ex. 11 | 90 | 0 | 10 | 0 | " | 0.020 | 0.5 | 120 | 6.5 | 5.2 | 33 |
| Comp. Ex. 12 | 85 | 0 | 15 | 0 | " | 0.020 | 0.5 | 120 | 7.0 | 6.2 | 39 |
| Comp. Ex. 13 | 80 | 0 | 20 | 0 | " | 0.020 | 0.5 | 120 | 7.4 | 8.6 | 53 |
| Comp. Ex. 14 | 80 | 5 | 15 | 0 | " | 0.020 | 0.5 | 105 | 7.2 | 8.1 | 40 |
| Comp. Ex. 15 | 80 | 5 | 2 | 13 | " | 0.020 | 0.5 | 151 | 5.0 | 9.9 | 41 |
| Comp. Ex. 16 | 68 | 15 | 15 | 2 | " | 0.003 | 0.5 | 82 | 5.0 | 8.0 | 53 |
| Comp. Ex. 17 | 68 | 15 | 15 | 2 | " | 0.030 | 0.5 | 82 | 11.2 | 13.3 | 92 |
| Comp. Ex. 18 | 68 | 15 | 15 | 2 | " | 0.050 | 0.1 | 82 | 16.8 | 14.0 | 101 |
| Comp. Ex. 19 | 68 | 15 | 15 | 2 | " | 0.020 | 0 | 82 | 5.2 | 13.2 | 36 |
| Comp. Ex. 20 | 40 | 20 | 15 | 25 | " | 0.020 | 0.5 | 148 | 11.6 | 13.1 | 96 |
| Comp. Ex. 21 | 40 | 25 | 15 | 20 | " | 0.020 | 0.5 | 130 | 13.6 | 11.6 | 110 |
| Comp. Ex. 22 | 40 | 20 | 25 | 15 | " | 0.020 | 0.5 | 113 | 15.2 | 13.3 | 115 |

TABLE 3-continued

| | Powder Composition | | | | | Additives (mol %) | | Sintered Ceramic | | | |
|---|---|---|---|---|---|---|---|---|---|---|---|
| | Basic Materials (mol %) | | | | Dopant Source | | | Curie Temperature | Specific Resistance | Temperature Coefficient, α | Withstand Voltage |
| | BaTiO₃ | SrTiO₃ | CaTiO₃ | PbTiO₃ | (mol %) | MnC₂O₄ | SiO₂ | (°C.) | (Ω.cm) | (%/°C.) | (V/mm) |
| Comp. Ex. 23 | 68 | 15 | 15 | 2 | " | 0.020 | 0.5 | 82 | 9.2 | 10.6 | 45 |
| Comp. Ex. 24 | 55 | 15 | 25 | 5 | La₂O₃: 0.40 | 0.050 | 2.0 | 93 | 18.6 | 12.7 | 112 |

EXAMPLE 17

In place of Mn (manganese oxalate) in the foregoing examples, CuO was employed as a special additive in combination with silica. The CuO powder used as the raw material was smaller than 10 μm in particle size.

Figure 4:
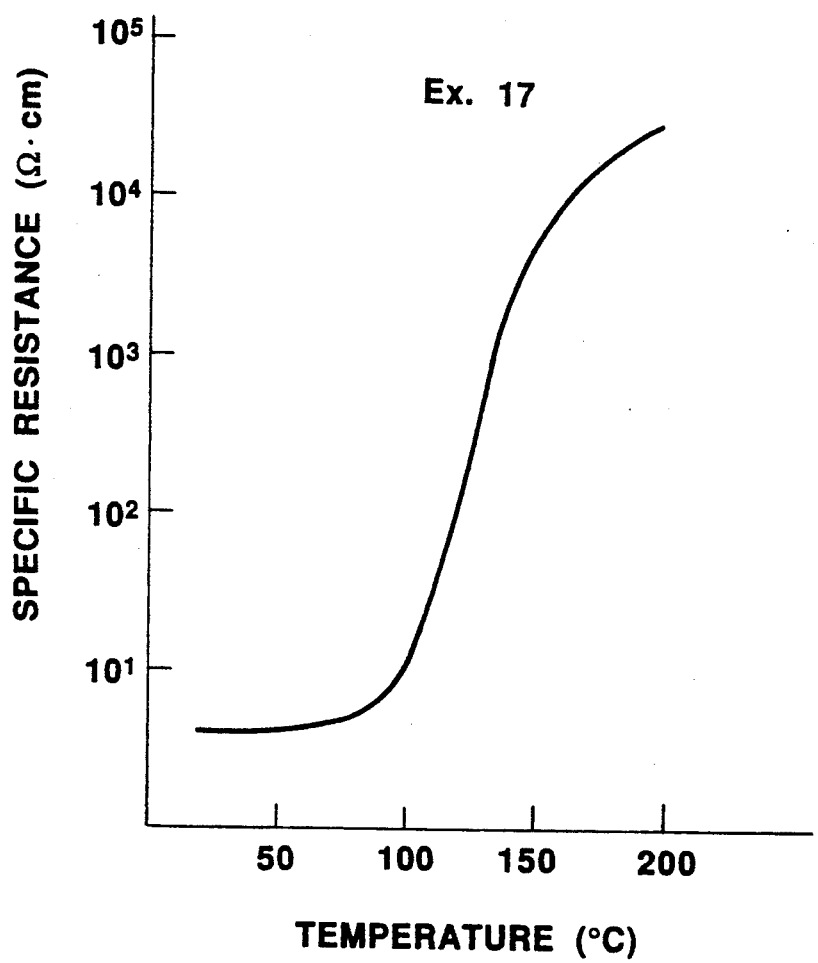
FIGS. 4 and 5 are graphs showing the temperature-resistance characteristics of two still different examples of semiconductive ceramics produced by a method according to the invention.

Except the change of Mn to CuO and slight changes in the amounts of addition of La₂O₃ and SiO₂, as shown in Table 4, the process of Example 1 was repeated by using the same raw materials. The characteristics of the sintered ceramic disc are shown in Table 4. FIG. 4 shows the temperature-resistance characteristic of the ceramic of Example 17. This ceramic had a Curie temperature of 94° C.

EXAMPLES 18-30

In these examples the process of Example 17 was repeated, but the amounts of the additives were selectively changed as shown in Table 4. Furthermore, the dopant to afford semiconductivity to the sintered ceramic was changed to Y (using Y₂O₃) in Example 27 and to Ce (using Ce₂O₃) in Example 28. The characteristics of the sintered ceramics of these examples were as shown in Table 4.

COMPARATIVE EXAMPLE 25

The process of Example 17 was modified only in that the amount of La₂O₃ was increased to 0.20 mol % of the total of the basic materials. That is, in this case La amounted to 0.40 mol % of the total of the basic materials. In this case the sintered ceramic was very high in specific resistance and regarded as a dielectric material.

the mixture of the basic materials and the dopant source. The raw materials used in these examples were the same as in the foregoing examples. In every case the basic materials were 65 mol % of BatiO₃, 11 mol % of SrTiO₃, 15 mol % of CaTiO₃ and 9 mol % of PbTiO₃, and the dopant source was La₂O₃ amounting to 0.13 mol % of the total of the basic materials.

In each example a sintered ceramic disc 13 mm in diameter and 2 mm in thickness was produced by the method described in Example 1, though the sintering temperature and time were changed. The sintering temperature was 1320° C. in Examples 31-34 and 1340° C. in Examples 35-38, and the sintering time was 4 hr throughout Examples 31-38.

Figure 5:
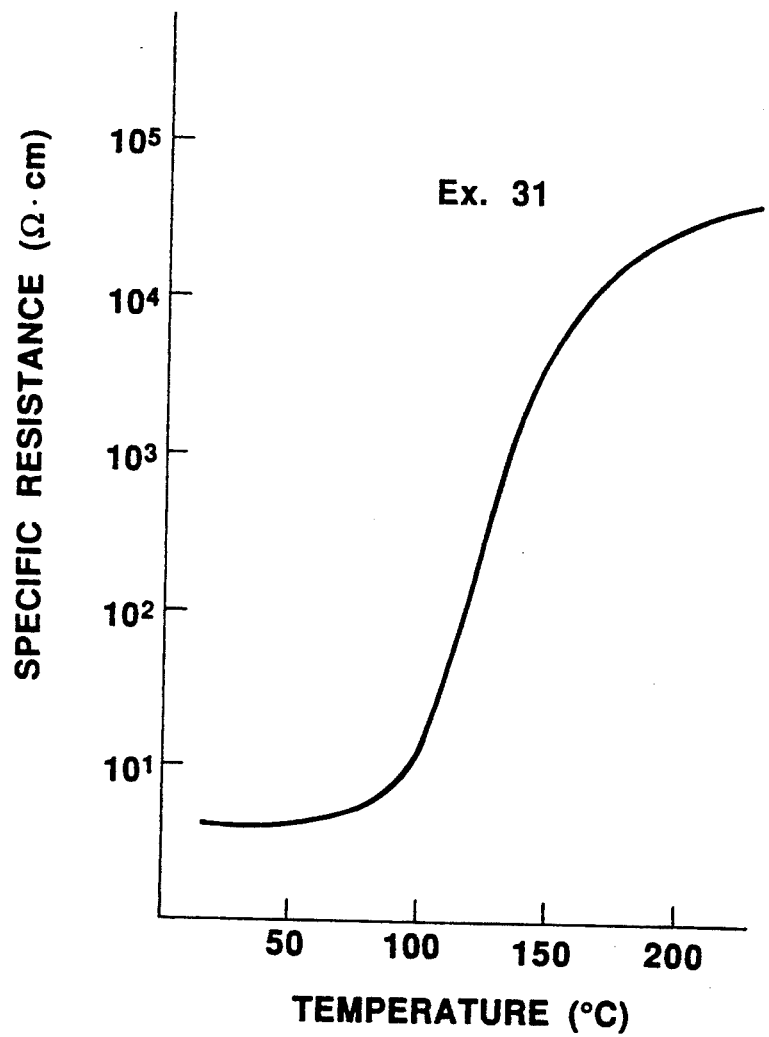

The characteristics of the sintered ceramics of Examples 31-38 are shown in Table 5. FIG. 5 shows the temperature-resistance characteristic of the ceramic of Example 31. The ceramic of Example 31 had a Curie temperature of 94° C.

Figure 6:
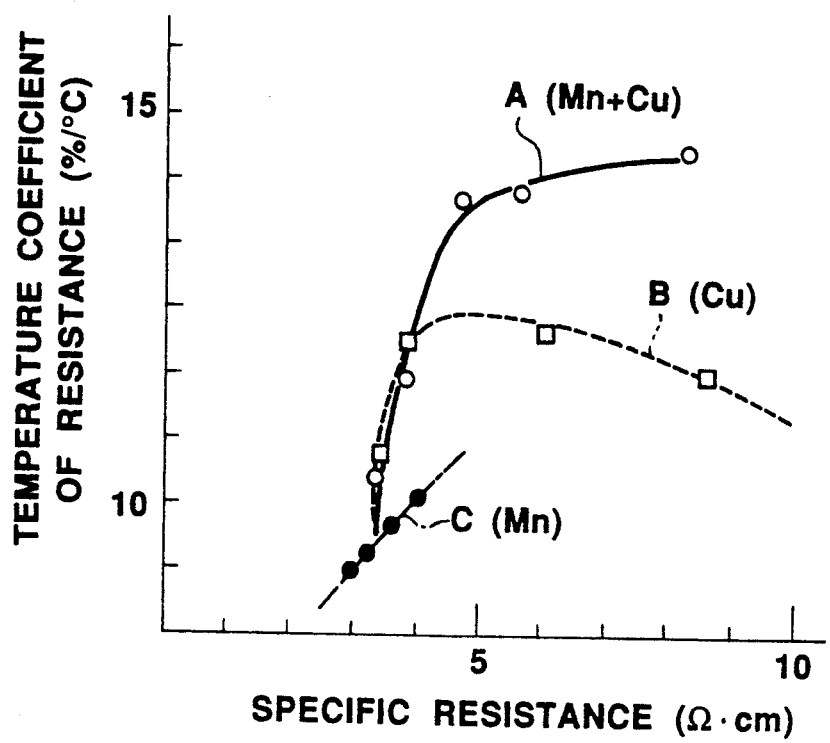
FIG. 6 is a graph showing the effect of Mn, Cu or a combination of Mn and Cu contained in a semiconductive titanate ceramic produced by the invention on the temperature coefficient of resistance of the ceramic.
Figure 7:
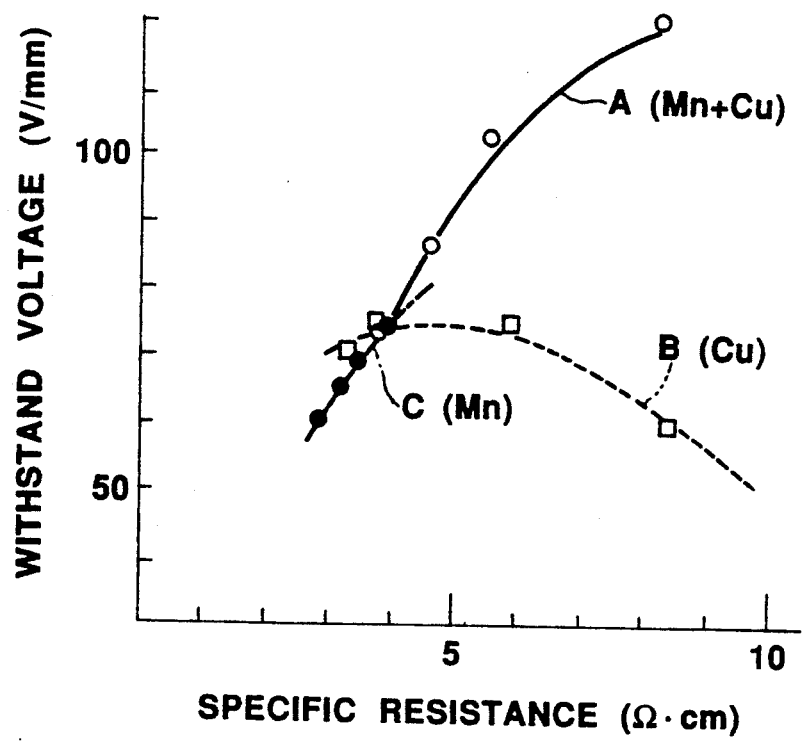
FIG. 7 is a graph showing the effect of Mn, Cu or a combination of Mn and Cu contained in a semiconductive titanate ceramic produced by the invention on the withstand voltage of the ceramic.

With respect to the ceramics of Examples 31-34, the relationship between the specific resistance at room temperature and the temperature coefficient of resistance, α, was as represented by the curve A in FIG. 6, and the relationship between the specific resistance and the withstand voltage was as represented by the curve A in FIG. 7. In each of FIGS. 6 and 7 the curve B represents the ceramics of the same basic composition (65 mol % BaTiO₃, 11 mol % SrTiO₃, 15 mol % CaTiO₃ and 9 mol % PbTiO₃) containing only CuO and SiO₂ as special additives, and the curve C represents the ceramics of the same basic composition containing only Mn and SiO₂ as special additives. In FIG. 6 it is seen that when Mn alone is added in combination with SiO₂

TABLE 4

| | Powder Composition | | | | | Additives (mol %) | | Sintered Ceramic | | |
|---|---|---|---|---|---|---|---|---|---|---|
| | Basic Materials (mol %) | | | | Dopant Source | | | Specific Resistance | Temperature Coefficient, α | Withstand Voltage |
| | BaTiO₃ | SrTiO₃ | CaTiO₃ | PbTiO₃ | (mol %) | CuO | SiO₂ | (Ω.cm) | (%/°C.) | (V/mm) |
| Ex. 17 | 65 | 11 | 15 | 9 | La₂O₃: 0.13 | 0.020 | 0.75 | 3.4 | 10.8 | 70 |
| Ex. 18 | 65 | 11 | 15 | 9 | " | 0.025 | 0.75 | 3.9 | 12.4 | 75 |
| Ex. 19 | 65 | 11 | 15 | 9 | " | 0.040 | 0.75 | 6.0 | 12.6 | 75 |
| Ex. 20 | 65 | 11 | 15 | 9 | " | 0.050 | 0.75 | 8.6 | 12.0 | 60 |
| Ex. 21 | 65 | 11 | 15 | 9 | " | 0.060 | 0.75 | 7.7 | 12.4 | 55 |
| Ex. 22 | 65 | 11 | 15 | 9 | La₂O₃: 0.08 | 0.025 | 0.75 | 7.2 | 12.4 | 90 |
| Ex. 23 | 65 | 11 | 15 | 9 | La₂O₃: 0.10 | 0.025 | 0.75 | 3.0 | 11.7 | 60 |
| Ex. 24 | 65 | 11 | 15 | 9 | La₂O₃: 0.13 | 0.025 | 1.00 | 3.4 | 11.1 | 75 |
| Ex. 25 | 65 | 11 | 15 | 9 | " | 0.025 | 1.50 | 5.9 | 11.1 | 99 |
| Ex. 26 | 65 | 11 | 15 | 9 | " | 0.025 | 2.00 | 9.2 | 12.0 | 133 |
| Ex. 27 | 65 | 11 | 15 | 9 | Y₂O₃: 0.13 | 0.025 | 0.75 | 4.6 | 12.4 | 74 |
| Ex. 28 | 65 | 11 | 15 | 9 | Ce₂O₃: 0.13 | 0.025 | 0.75 | 4.0 | 11.9 | 70 |
| Ex. 29 | 65 | 11 | 15 | 9 | La₂O₃: 0.13 | 0.010 | 0.75 | 3.3 | 9.5 | 46 |
| Ex. 30 | 65 | 11 | 15 | 9 | " | 0.025 | 0.50 | 3.5 | 10.7 | 45 |
| Comp. Ex. 25 | 65 | 11 | 15 | 9 | La₂O₃: 0.20 | 0.025 | 0.75 | dielectric | — | — |

EXAMPLES 31-38

Example 17 was modified by adding Mn (using manganese oxalate powder) together with CuO and SiO₂ to the ceramics are relatively low in the value of the temperature coefficient, α, and in FIG. 7 it is seen that when CuO alone is added in combination with SiO$_2$ the ceramics are relatively low in withstand voltage. When both Mn and CuO are added together with SiO$_2$ the ceramics are relatively high in both the value of the coefficient and withstand voltage. That is, the graphs in FIGS. 6 and 7 indicate that a synergetic effect is produced by the joint addition of Mn and CuO.

TABLE 5

| | Additives (mol %) | | | Sintered Ceramic* | | |
|---|---|---|---|---|---|---|
| | CuO | MnC$_2$O$_4$ | SiO$_2$ | Specific Resistance (Ω.cm) | Temperature Coefficient, α (%/°C.) | Withstand Voltage (V/mm) |
| Ex. 31 | 0.010 | 0.010 | 0.75 | 3.9 | 11.9 | 74 |
| Ex. 32 | 0.015 | 0.015 | 0.75 | 4.7 | 13.2 | 88 |
| Ex. 33 | 0.020 | 0.020 | 0.75 | 5.6 | 13.8 | 104 |
| Ex. 34 | 0.025 | 0.025 | 0.75 | 8.2 | 14.4 | 122 |
| Ex. 35 | 0.010 | 0.010 | 0.75 | 3.4 | 10.4 | 65 |
| Ex. 36 | 0.015 | 0.015 | 0.75 | 3.7 | 11.8 | 79 |
| Ex. 37 | 0.020 | 0.020 | 0.75 | 4.8 | 13.6 | 98 |
| Ex. 38 | 0.025 | 0.025 | 0.75 | 6.4 | 14.4 | 120 |

*Examples 31-34: sintered at 1320°C.
Examples 35-38: sintered at 1340°C.

COMPARATIVE EXAMPLES 26-34

In these comparative examples, Example 31 of the invention was modified only in respect of the particulars of the method of preparing one of the basic materials. That is: in Comparative Examples 26-28 the conditions of the synthesis of barium titanium oxyoxalate in Referential Example 1 were changed as in the same mnnaers as in Comparative Examples 1-3 shown in Table 2-A, respectively; in Comparative Examples 29-31 the conditions of the synthesis of strontium titanium oxyoxalate in Referential Example 2 were changed in the same mannera as in Comparative Examples 4-6 shown in Table 2-A, respectively; in Comparative Examples 32-34 the conditions of the synthesis of lead titanium oxyoxalate in Referential Example 3 were changed in the same manners as in Comparative Examples 7-9 shown in Table 2-A. The particulars of the titanate powders prepared and used in Comparative Examples 26-34 were as shown in Table 2-B.

The characteristics of the sintered ceramics of Comparative Examples 26-34 are also shown in Table 6.

TABLE 6

| | Changed Material | Sintered Ceramic | | |
|---|---|---|---|---|
| | | Specific Resistance (Ω.cm) | Temperature Coefficient, α (%/°C.) | Withstand Voltage (V/mm) |
| Comp. Ex. 26 | BaTiO$_3$ | 7.9 | 11.2 | 47 |
| Comp. Ex. 27 | BaTiO$_3$ | 6.1 | 10.1 | 49 |
| Comp. Ex. 28 | BaTiO$_3$ | 11.9 | 8.8 | 45 |
| Comp. Ex. 29 | SrTiO$_3$ | 13.9 | 12.5 | 130 |
| Comp. Ex. 30 | SrTiO$_3$ | 12.0 | 11.8 | 65 |
| Comp. Ex. 31 | SrTiO$_3$ | 9.2 | 11.1 | 48 |
| Comp. Ex. 32 | PbTiO$_3$ | 15.5 | 15.1 | 44 |
| Comp. Ex. 33 | PbTiO$_3$ | 10.8 | 13.2 | 46 |
| Comp. Ex. 34 | PbTiO$_3$ | 7.5 | 12.1 | 46 |

What is claimed is:

1. A powder composition for producing a modified barium titanate ceramic which is semiconductive and has a positive temperature coefficient of resistance, the powder composition comprising:
   a basic mixture consisting of (i) 45-85 mol % of a BaTiO$_3$ powder of which the primary particles are not larger than 0.2 μm and agglomerate so as to constitute secondary particles which have open pores and have a mean particle size in the range from 150 to 250 μm on condition that at least 95 wt % of the secondary particles are larger than 50 μm, said BaTiO$_3$ powder being a powder produced by calcining barium titanium oxyoxalate at a temperature in the range from 700° to 900° C., (ii) 1-20 mol % of a SrTiO$_3$ powder of which the primary particles are not larger than 0.1 μm and agglomerate so as to constitute secondary particles which have open pores and have a mean particle size in the range from 70 to 180 μm, the SrTiO$_3$ powder being in the range from 20 to 30 m$^2$/g in specific surface area measured by the BET adsorption method, said SrTiO$_3$ powder being a powder produced by calcining strontium titanium oxyoxalate at a temperature in the range from 700° to 900° C., (iii) 5-20 mol % of a CaTiO$_3$ powder of which the primary particles have a mean particle size not larger than 2 μm and (iv) 1-20 mol % of a PbTiO$_3$ powder of which the primary particles have a mean particle size not larger than 2 μm and agglomerate so as to constitute secondary particles which have open pores and have a mean particle size in the range from 50 to 150 μm on condition that at least 95 wt % of the secondary particles are larger than 20 μm, said PbTiO$_3$ powder is a powder produced by calcining lead titanium oxyoxalate at a temperature in the range from 600° to 800° C.;
   at least one dopant element to render said ceramic semiconductive, which is selected from the group consisting of Nb, Sb and the rare earth elements and in the form of an oxide or a precursor of the oxide, the total amount of said at least one dopant element being from 0.1 to 0.3 mol % on the basis of the quantity of said basic mixture;
   at least one improving additive selected from the group consisting of a source of Mn and a source of Cu, the total amount of said at least one improving additive being such that the total amount of Mn and Cu is not more than 0.06 mol % on the basis of the quantity of said basic mixture with proviso that the amount of Mn is not more than 0.025 mol % on the basis of the quantity of said basic mixture; and
   another improving additive which is SiO$_2$ and amounts to 0.1-2.0 mol % on the basis of the quantity of said basic mixture.

2. A powder composition according to claim 1, wherein the composition contains both a source of Mn and a source of Cu and wherein further each of said Mn and said Cu amounts to at least 0.005 mol % on the basis of the quantity of said basic mixture.

3. A powder composition according to claim 1, wherein said at least one improving additive is solely a source of Mn, the amount of said Mn being at least 0.005 mol % on the basis of the quantity of said basic mixture.

4. A powder composition according to claim 1, wherein said at least one improving additive is solely a source of Cu, the amount of said Cu being at least 0.02 mol % on the basis of the quantity of said basic mixture.

5. A powder composition according to claim 1, wherein the amount of said SiO$_2$ is in the range from 0.5 to 1.0 mol % on the basis of the quantity of said basic mixture.

6. A powder composition according to claim 1, wherein said source of Mn is selected from the group consisting of manganese oxide and manganese oxalate.

7. A powder composition according to claim 1, wherein said source of Cu is selected from the group consisting of copper oxide, copper sulfide and copper oxalate.

* * * * *